United States Patent
Kim et al.

(10) Patent No.: US 7,480,350 B2
(45) Date of Patent: Jan. 20, 2009

(54) CARRIER RECOVERY APPARATUS AND BROADCASTING RECEIVER USING THE SAME

(75) Inventors: Tok Kim, Seoul (KR); Sung Ryong Hong, Gyeonggi-do (KR)

(73) Assignee: LG Electronics Inc.

( * ) Notice: Subject to any disclaimer, the term of this patent is extended or adjusted under 35 U.S.C. 154(b) by 767 days.

(21) Appl. No.: 11/020,986

(22) Filed: Dec. 22, 2004

(65) Prior Publication Data

US 2005/0135508 A1    Jun. 23, 2005

(30) Foreign Application Priority Data

Dec. 22, 2003    (KR)    .................. 10-2003-0094514

(51) Int. Cl.
- *H04L 27/14*    (2006.01)
- *H04L 27/06*    (2006.01)
- *H04L 27/22*    (2006.01)
- *H04N 5/50*     (2006.01)

(52) U.S. Cl. .................. 375/326; 375/344; 348/735

(58) Field of Classification Search .................. 375/321, 375/326, 327, 332, 344; 329/304, 307, 308, 329/323, 325, 346, 357, 358, 360; 348/725, 348/726, 729, 735

See application file for complete search history.

(56) References Cited

U.S. PATENT DOCUMENTS

| | | | | |
|---|---|---|---|---|
| 5,812,615 A | * | 9/1998 | Baum et al. | 375/344 |
| 5,920,220 A | * | 7/1999 | Takao et al. | 327/233 |
| 6,215,819 B1 | * | 4/2001 | Hyakudai et al. | 375/240 |
| 6,748,029 B1 | * | 6/2004 | Lee | 375/326 |
| 2002/0126771 A1 | * | 9/2002 | Li et al. | 375/324 |
| 2004/0067039 A1 | * | 4/2004 | Jun | 386/1 |
| 2004/0114675 A1 | * | 6/2004 | Crawford | 375/149 |
| 2004/0136474 A1 | * | 7/2004 | Hwang | 375/326 |

* cited by examiner

*Primary Examiner*—Young T. Tse
(74) *Attorney, Agent, or Firm*—Lee, Hong, Degerman, Kang & Waimey

(57) ABSTRACT

Provided is a carrier recovery apparatus in a vestigial sideband modulation (VSB) type digital television (DTV) receiver. The carrier recovery apparatus dynamically controls a sign determination level which is a reference for determining a sign of an I signal in a sign extractor. Therefore, the carrier recover apparatus can eliminate unnecessary sign extraction caused by zero-crossing which is generated when the receiver receives a pilot signal weaken by a channel ghost, and improves the frequency lock performance in the receiver. Specially, the carrier recover apparatus can effectively improve the frequency lock performance when comparatively large pattern jitter is existed in a low pass signal caused by a ghost signal produces a long delay time.

17 Claims, 15 Drawing Sheets

$f_c = f'_c$ $f_c < f'_c$

CARRIER RECOVERY APPARATUS AND BROADCASTING RECEIVER USING THE SAME

This application claims the benefit of the Korean Application No. 10-2003-0094514 filed on Dec. 22, 2003 which is hereby incorporated by reference.

BACKGROUND OF THE INVENTION

1. Field of the Invention

The present invention relates to a broadcasting receiver for a digital television (DTV), and more particularly, to a carrier recovery apparatus in a vestigial sideband modulation (VSB) type DTV broadcasting receiver.

2. Discussion of the Related Art

A vestigial sideband modulation (VSB) of Grand Alliance has been selected as a standard for digital television (DTV) transmission system in America and Korea. The grand alliance VSB is a method for modulating one of sidebands generated by amplitude-modulating a signal. That is, in the grand alliance VSB, a signal is amplitude-modulated in order to generate two sidebands with a carrier wave as a center, one of sidebands is attenuated and a remained sideband is modulated.

That is, the grand alliance VSB is one of methods effectively using a band by obtaining a spectrum of one sideband in a baseband and shifting it to passband.

When a signal is modulated according to VSB, a DC spectrum of the baseband is shifted to the passband and thus the DC spectrum is changed to a tone spectrum. This signal is commonly called as a pilot signal. A broadcasting station transmits the pilot signal to a receiver with a modulated signal for accurately demodulating the modulated signal at the receiver when a signal is modulated according to the VSB in the broadcasting station.

FIG. 1 is a block diagram illustrating a transmitter using a vestigial sideband modulation (VSB) adopted in an advanced television systems committee (ATSC).

By referring to FIG. 1, the transmitter includes a randomizer 101, a Reed-Solomon encoder (RS-encoder) 102, a data interleaver 103, a trellis encoder 104, a multiplexer 105, a pilot inserter 105, a VSB modulator 107 and a radio frequency (RF) up-converter 108.

The randomizer 101 randomly outputs data to the RS-encoder 102 for generating a white symbol.

The RS-encoder 102 encodes the randomly inputted data according to a Reed Solomon (RS) encoding method for an inside and a outside channel coating and additionally inserts 20 bytes parity code in to the RS encoded data. After inserting, the RS-encoder 102 outputs the RS encoded data to the interleaver 103.

The interleaver 103 interleaves the RS-encoded data according to a predetermined rule. After interleaving, the interleaver 103 outputs the interleaved data to the trellis encoder 104. The trellis encoder 104 converts the interleaved data from a byte to a symbol and encodes the converted symbol for generating a trellis encoded symbol sequence. After trellis encoding, the trellis encoded symbol sequence is outputted to the multiplexer 105

The multiplexer 105 muxes the trellis encoded symbol sequence, a segment synchronizing signal and a field synchronizing signal at each segment and each frame for generating a frame. The multiplexer 105 outputs the generated frame to the pilot inserter 105.

The pilot inserter 105 inserts a pilot signal which is a DC value in the framed transmitting symbol and outputs the pilot symbol inserted frame to the VSB modulator 107.

A construction of the randomizer 101, the RS-encoder 102, the interleaver 103, the trellis encoder 104, the multiplexer 105 and the pilot inserter 106 is called as a channel encoder.

The VBS modulator 107 receives the encoded digital signal outputted from the channel encoder and modulates the encoded digital signal to VSB intermediate frequency signal having 6 MHz bandwidth by the VSB modulator 107. The modulated signal is outputted to the RF up-converter 108. The RF up-converter 108 converts the modulated signal to a RF passband signal and the RF passband signal is transmitted through a transmitting antenna 109.

FIG. 2 is a detailed diagram showing the VSB modulator 107 in FIG. 1.

As shown in FIG. 2, the VSB modulator includes a complex filter 201, an intermediate frequency converter 202 and a subtractor 203.

The encoded digital signal outputted from the channel encoder is inputted to the complex filter 201 for VSB modulation. When the encoded digital signal is passed through the complex filter 201, forms of frequencies of I and Q signals are changed for VSB modulation.

The intermediate frequency modulator 202 modulates each of I and Q signals to an intermediate frequency I signal and an intermediate frequency Q signal ($f_c$) and outputs the intermediate frequency I signal and the intermediate frequency Q signal to the subtractor 203.

The subtractor 203 subtracts the intermediate frequency Q signal from the intermediate frequency I signal for generating VSB intermediate signal having 65 MHz bandwidth.

The RF up-converter 108 converts the VSB intermediate signal from the subtractor 203 to a RF passband signal and the RF passband signal is transmitted through the antenna 109 to a receiver.

As mentioned above, the transmitter transmits the VSB intermediate signal with the pilot signal to the receiver through a transmission channel by modulating the signal and inserting the pilot signal into the modulated signal in the VSB modulator 107. Therefore, the receiver can accurately demodulate the VSB intermediate signal by using a carrier recovery unit in the receiver.

FIG. 3 is a graph showing a frequency characteristic of sky wave signal defined by a digital television (DTV) standard in America and Korea. A center frequency ($f_c$) and a pilot frequency ($f_p$) are different according to each channel. But, in FIG. 3, the center frequency is described as $f_c$ and the pilot frequency is described as $f_p$.

For example, the center frequency $f_c$ is a middle of frequency in 6 MHz bandwidth of each ground channel and the pilot frequency $f_p$ is a frequency including a carrier signal in a transmitting signal. A reason for using a pilot signal instead of carrier signal is that intensity of carrier signal is reduced as much as 13 dB in order to avoid influencing the analog TV signal.

Accordingly, the carrier recovery unit in the DTV receiver accurately recovers a location of the pilot frequency $f_p$ in frequency of the transmitting signal and the recovered pilot frequency is converted to a baseband signal.

General algorithm used in the carrier recovery unit is a digital frequency phase loop lock (DFPLL) algorithm. The DFPLL algorithm has several advantages. That is, it is easy to be implemented as a circuit and has superior performance.

The carrier recovery unit based on the DFPLL receives a passband I signal and a passband Q signal from an A/D converter located in front of the carrier recovery unit and demodulates the passband I signal and the passband Q signal for locking the phase and frequency of the passband I and Q signals.

The DFPLL performs a frequency locked loop for eliminating frequency difference between the carrier wave of the receiving signal and a reference carrier wave of the receiver and then performs a phase locked loop (PLL) for eliminating phase difference between two carrier waves where the frequency difference eliminated.

FIG. 4 is a block diagram illustrating a carrier recovery apparatus based on DFPLL in accordance with a related art.

As shown in FIG. 4, the carrier recovery apparatus includes a phase divider 501, a complex multiplier 502, a frequency phase error detector (FPED) 503, a loop filter 504, a numerically controlled oscillator (NCO) 505.

By referring to the FIG. 4, the phase divider 501 receives a digitalized signal from an A/D converter located in front of the phase divider 501 and divides the digitalized signal to an I passband signal and a Q passband signal by multiplying the received digitalized signal to an I component and a Q component. The I and the Q signals are outputted to the complex multiplier 502.

The complex multiplier 502 receives a complex carrier which is carrier recovered from the numerically controlled oscillator (NCO) 505. That is, the complex multiplier 502 receives a sine wave (SIN) and a cosine wave (COS) from the NCO 505. The complex multiplier 502 multiplies the complex carrier to the I and the Q passband signals from the phase divider 501 for shifting the I and the Q passband signals to an I baseband signal and a Q baseband signal.

The I baseband signal and the Q baseband signal are outputted to a DC eliminator located at back of the carrier recover apparatus and simultaneously outputs to the frequency phase error detector (FPED) 503 for carrier recovery.

The FPED 503 includes a first and a second low pass filters 503a, 503b, a delay 503c, a sign extractor 503d and a multiplier 503e.

The first low pass filter 503a receives the I baseband signal from the complex multiplier 502 and the second low pass filter 503b receives the Q baseband signal from the complex multiplier 502.

Inhere, the carrier recovery apparatus requires a signal around frequency including a pilot frequency ($f_p$) in 6 MHz bandwidth. Therefore, the first and the second low pass filters 503a, 503b eliminates frequency components including data components from the I baseband signal and the Q baseband signal for preventing a performance degradation of the carrier recovery apparatus by data.

In other words, the pilot signal in the I and Q baseband signals is changed to a DC component. In more detail, they are changed to frequency component around DC component.

It is generated by component difference between a carrier wave generated at the NCO 505 and a carrier wave component of the inputted signal. Accordingly, data component excepting the component around DC is eliminated by the first and the second low pass filters 503a and 503b since components around DC is required for recovering the carrier wave.

The output signal of the first low pass filter 503a is inputted to the delay 503c.

The delay 503c delays the data component eliminated I signal from the first filter 503a as long as a predetermined time and outputs the delayed I signal to the sign extractor 503d. During delaying, if the pilot component of I signal outputted from the first low pass filter 503a is not exactly changed to the target DC components during passing the delay 503c, the phase error is generated as much as the difference between the target DC component and the delayed pilot component of I signal.

Accordingly, the delay 503c converts difference between the pilot component of the inputted passband signal and the carrier frequency component of NCO 505 to a phase error and outputs the phase error to the sign extractor 503d.

The sign extractor 503d extracts a sign of the signal outputted from the delay 503c and outputs the extracted sign in a form of 1 or −1 to the multiplier 503e. The multiplier 503e multiplies the extracted sign of the I signal and the data component eliminated Q signal and outputs the multiplying result as a phase error to the loop filter 504.

The loop filter 504 filters the phase error from the multiplier 503e and integrates the filtered phase error. The integrated phase error is outputted to the NCO 505. The NCO 505 generates a complex carrier (COS, SIN) corresponding to the output of the loop filter 504 and outputs the generated complex carrier to the complex multiplier 502.

According to the above mentioned procedure, the complex carrier becomes similar to the carrier frequency components of the received signal.

By repeating the above mentioned procedure, the NCO 505 generates the carrier frequency signal having similar to the carrier frequency component of received signal and outputs the generated carrier frequency signal to the complex multiplier 502. The complex multiplier 502 shifts the passband signal to the baseband signal.

That is, if the pilot frequency of the inputted carrier signal component and the frequency component of the carrier signal generated in the NCO 505 are exactly matched, the PLL is completed.

However, they could not be exactly matched because of characteristics of the NCO 505 and characteristics of transmission line.

Accordingly, the carrier recovery apparatus compensates the unmatched frequency components and changes a frequency of the NCO 505 for matching the frequencies of two carrier signals.

That is, before completing the PLL, the sign extractor 503d alternatively outputs 1 and −1 and after completing the PLL, the sign extractor selects one of 1 and −1 and continuously outputs selected one.

When the sign extractor 506 outputs constant sign, the first low pass filter 503a, the delay 503c and the sign extractor 503d are stopped to be operated and the second low pass filter 503c is only operated. That is, if the PLL is completed, a phase locked loop (PLL) is automatically performed for eliminating a phase error between two carrier signals.

The above mentioned DFPLL has simple construction, a superior frequency lock performance and high stability.

FIGS. 5a to 5c are graphs showing wave forms for explaining principle of FLL operation in a carrier recovery unit in accordance with a related art.

In FIGS. 5a to 5c, A(t), B(t), B'(t), B"(t) and c(t) represent output signals of the second low pass filter 503b, the first low pass filter 503a, the delay 503c, the sign extractor 503d and the multiplier 503e in FIG. 4, respectively.

FIG. 5a shows waveforms when an input frequency $f_c$ of the carrier recovery unit 306 is identical to an output frequency $f_c'$ of the NCO 505 ($f_c'=f_c$) and the output signal of the second low pass filter 503b is a cosine signal form and the output signal of the first low pass filter 503a is a sine signal form.

That is, because the input frequency $f_c$ of the carrier recovery unit 306 is identical to an output frequency $f_c'$ of the NCO 505, the delay 503c outputs the output signal of the first low pass filter 503a without delaying. Accordingly, the output signal B(t) of the first low pass filter 503a and the output signal B'(t) of the delay 503c are identical.

The output signal B'(t) of delay 503c is analyzed at the sign extractor 503d for detecting a sign of the signal. That is, if the output signal B'(t) is in a range of 0 degree to 180 degree, the sign extractor 503d outputs a signal of 1 and if the output signal B'(t) is in a range of 180 degree to 360 degree, the sign extractor 503d outputs a signal of −1.

Therefore, The multiplier 503e alternatively outputs the output signal C(t) having a negative value or the output signal C(t) having a positive value since the multiplier 503e multiplies the output signal B'(t) of the sign extractor 503d and the output signal A(t) of the second low pass filter. Accordingly, the FPED 503 outputs a signal having 0 as a DC value.

FIG. 5b shows waveforms when the input frequency $f_c$ of the carrier recovery unit 306 is smaller then the output frequency $f_c'$ of the NCO 505 ($f_c<f_c'$), and the output signal A(t) of the second low pass filter 503b is a cosine signal form and the output signal of the first low pass filter 503a is a sine signal form.

As shown in FIG. 5b, the delay 503c converts a difference between $f_c$ and $f_c'$ to a phase error and output the phase error because the input frequency $f_c$ of the carrier recovery unit 306 is smaller then the output frequency $f_c'$ of the NCO 505.

In an example of the FIG. 5b, the delay 503c delays the output signal B(t) of the first low pass filter 503a as much as −90 degree and outputs the signal B'(t).

The output signal B'(t) of the delay 503c is analyzed at the sign extractor 503d for detecting sign of the signal. That is, if the output signal B'(t) is in a range of 0 degree to 90 degree, the sign extractor 503d outputs a signal of −1, if the output signal B'(t) is in a range of 90 degree to 270 degree, the sign extractor 503d outputs a signal of I and if the output signal B'(t) is in a range of 270 degree to 360 degree, the sign extractor 503d outputs a signal of −1.

Accordingly, the multiplier 503e always outputs the output signal C9t) having a negative value and the FPED 503 outputs a signal having a negative DC value.

FIG. 5c shows waveforms when the input frequency $f_c$ of the carrier recovery unit 306 is larger then the output frequency $f_c'$ of the NCO 505 ($f_c>f_c'$), and the output signal A(t) of the second low pass filter 503b is a cosine signal form and the output signal of the first low pass filter 503a is a sine signal form.

As shown in FIG. 5b, the delay 503c converts a difference between $f_c$ and $f_c'$ to a phase error and output the phase error because the input frequency $f_c$ of the carrier recovery unit 306 is larger then the output frequency $f_c'$ of the NCO 505.

In an example of the FIG. 5b, the delay 503c delays the output signal B(t) of the first low pass filter 503a as much as +90 degree and outputs the signal B'(t).

The output signal B'(t) of the delay 503c is analyzed at the sign extractor 503d for detecting sign of the signal. That is, if the output signal B'(t) is in a range of 0 degree to 90 degree, the sign extractor 503d outputs a signal of 1, if the output signal B'(t) is in a range of 90 degree to 270 degree, the sign extractor 503d outputs a signal of −1 and if the output signal B'(t) is in a range of 270 degree to 360 degree, the sign extractor 503d outputs a signal of 1.

Accordingly, the multiplier 503e always outputs the output signal C(t) having a positive value and the FPED 503 outputs a signal having a positive DC value.

As mentioned above, the FLL is operated according to the sing extracted from the sign extractor 503d and locks the frequency as a result of the FLL. Accordingly, the pilot component is located at a DC. Inhere, the first low pass filter output constant DC value closed to 0 and accordingly, the sign extractor 503d continuously outputs one of +1 or −1 according to a polarity of the input signal.

If the sign extractor 503d continuously outputs one of +1 or −1 according to a polarity of the input signal, the FLL operation is completed and the PLL is performed.

As mentioned above, in the receiving system, a state of frequency lock in the carrier recovery unit can be recognized by an accumulated output value of the sign extractor 503d That is, the sign extractor 503d alternatively outputs + value or − value before locking the frequency and the sign extractor 503d continuously outputs one of + value or − value after locking frequency.

An accumulator (not shown) accumulates the sign value outputted from the sign extractor 503d and if the accumulated sign value is exceed over a predetermined threshold value, the accumulator notices the locking of frequency.

FIG. 6 is a view for explaining a method for locking frequency in a carrier recover unit in accordance with a related art. In FIG. 6, a sign determination level is a reference location for determining the polarity of a signal at the sign extractor 503d and it is located at 0.

Also, '+ threshold value' and '− threshold value' are reference locations for determining whether a frequency locking is completed or not in the carrier recovery unit. That is, if accumulated sign value is larger than '+ threshold value', the frequency lock is completed as + polarity. Also, if accumulated sign value at the accumulator is smaller than '− threshold value', the frequency lock is completed as − polarity.

FIGS. 7a and 7b are graphs showing waveforms of I and Q signals outputted from the first and the second low pass filters at a channel having no ghost in accordance with a related art. And, FIGS. 8a and 8b are graphs showing waveforms of output signal from the signal extractor at a channel having no ghost in accordance with a related art.

As shown in FIG. 7a, when a polarity of the I signal is '+', the first low pass filter 503 alternatively outputs signals of '+' sign or '−' sign until the frequency lock is achieved. After achieving the frequency lock, the first low pass filter 503 outputs a DC pilot signal (I signal) having larger than the sign determination level (0). And the second low pass filter 504 outputs a Q signal located around the 0 value.

Accordingly, the sign extractor 506 alternatively outputs 1 or −1 initially and then continuously outputs I after a certain point as shown in FIG. 8a.

In contrary, as shown in FIG. 7b, when a polarity of the I signal is '−', the first low pass filter 503 alternatively outputs signals having '+' sign or '−' sign until the frequency lock is achieved. After achieving the frequency lock, the first low pass filter 503 outputs a DC pilot signal (I signal) having smaller value than the sign determination level(0). And the second low pass filter 504 outputs a Q signal located around the 0 value.

Accordingly, the sign extractor 506 alternatively outputs 1 or −1 initially and then continuously outputs −1 after a certain point as shown in FIG. 8b.

As mentioned above, in case of no ghost existed in the channel, the sign extractor 506 continuously outputs a signal of +1 or a signal of −1 according to the polarity of the input signal.

When the sign extractor 506 continuously outputs one of +1 or −1, it represents that the FLL mode operation is completed and the PLL mode operation is automatically performed.

However, when the pilot signal becomes weaken during passing through the channel, the output signal of the first low pass filter 503a becomes weaken too. Therefore, the sign extractor may have difficulty to extract a sign of the output signal from the first low pass filter 503a.

FIGS. 9a and 9b are graphs showing waveforms of output signal from the first low pass filter in accordance with a related art. And, FIG. 9c is a graph showing a waveform of output signal of the sign extractor at a channel having no ghost in accordance with a related art.

As shown in FIG. 9a, the output signals of the first low pass filter 503 are maintained to have average + value when a polarity of I signal is a positive (+). However, the output signal of the first low pass filter 503 becomes – value when the pilot signal becomes weaken according to the ghost. That is, the value of the output signal becomes crossed over the sign determination level 0(zero). It is commonly called as a zero-crossing.

In contrary, as shown in FIG. 9b, the output signals of the first low pass filter 503 are maintained to have average – value when a polarity of I signal is a negative (–). However, the output signal of the first low pass filter 503 becomes to + value when the pilot signal becomes weaken according to the ghost. That is, the value of the output signal becomes crossed over the sign determination level 0(zero).

By the zero-crossing, the sign extractor may alternatively output a signal having + value or a signal having – value as shown in FIG. 9C. And it may cause difficulty to the frequency lock.

Accordingly, the receiver may continuously stay in the FLL mode without changing to the PLL mode.

Furthermore, if the FLL mode is changed to the PLL mode, the sign extractor 506 may outputs signal having variable signs caused by changes in the channel. That is, the output signal of the sign extractor 506 may be changed from + value signal to – value signal or from – value signal to + value signal. Therefore, the PLL mode is unexpectedly changed to the FLL mode and it may degrade the performance of frequency lock.

SUMMARY OF THE INVENTION

Accordingly, the present invention is directed to a carrier recovery apparatus and a broadcasting receiver using the same that substantially obviate one or more problems due to limitations and disadvantages of the related art.

An object of the present invention is to provide a carrier recovery apparatus and a broadcasting receiver using the same for improving lock performance by avoiding unnecessary sign extraction caused by zero-crossing generated by an output signal of a low pass filter.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a carrier recovery apparatus includes: a first low pass filter for receiving a I baseband signal from a complex multiplier and eliminating data components in the I baseband signal excepting a pilot component, wherein the complex multiplier converts a digital I passband signal and a digital Q passband signal and the I baseband signal and a Q baseband signal; a second low pass filter for eliminating data component from the Q baseband signal; a delay for converting the pilot component of the I baseband signal from the first low pass filter to a DC component; a sign extractor for selecting one among sign determination levels having at least one or more different values and determining a sign of the I signal outputted from the delay based on the selected sign determination level; an accumulator for accumulating output signals of the sign extractor and outputting a sign determination level control signal to the sign extractor in order to select one of sign determination levels at the sign extractor; and a multiplier for generating a phase error by multiplying the sign of the I signal and the data component eliminated Q signal.

The difference values may be a zero (0), a positive value (+) and a negative value (–).

The accumulator may generate the sign determination level control signal for selecting the sign determination level having the negative value (–) if the accumulated value is larger than a positive threshold value.

The accumulator may generate the sign determination level control signal for selecting the sign determination level having the positive value (+) if the accumulated value is smaller than a negative threshold value.

The delay may delay the pilot component of the I signal as long as a predetermined time for converting the pilot component of the I signal to a target DC component.

In another aspect of the present invention, a carrier recovery apparatus includes: a phase divider for dividing a digital passband signal to an I passband signal and a Q passband signal; a complex multiplier for shifting the I passband signal and the Q passband signal to an I baseband signal and a Q baseband signal by multiplying the I passband signal and the Q passband signal with a complex carrier of cosine wave (COS) and a complex carrier of sine wave (SIN), respectively, wherein the complex carriers are carrier recovered complex carriers; a frequency phase error detector (FPED) for passing frequency components having a pilot component from the I baseband signal and the Q baseband signal, controlling a sign determination level by using an average values of signals where frequencies having data components are eliminated, and detecting a frequency phase error; a loop filter for filtering and integrating the frequency phase error; and a NCO unit for generating complex carriers of a cosine wave (COS) and a sine wave (SIN) corresponding to the output of the loop filter and outputting the generated complex carriers.

The frequency phase error detector may include: a first low pass filter for passing only a pilot component of I signal in the I baseband signal outputted from the complex multiplier; a second low pass filter for eliminating data component from the Q baseband signal outputted from the complex multiplier; a delay for delaying the pilot component of the I signal as long as a predetermined time; a sign extractor for selecting one among sign determination levels having at least one or more different values and determining a sign of the I signal outputted from the delay based on the selected sign determination level; and a multiplier for generating a phase error by multiplying a sign of the I signal outputted from the sign extractor and the data component eliminated Q signal from the second low pass filter.

The difference values may be a zero (0), a positive value (+) and a negative value (–)

The sign extractor may select the sign determination level having the negative value (–) when the output signals of the first low pass filter is zero-crossed and an average value of the output signals of the first low pass filter is a positive value (+), and the sign extractor may select the sign determination level having the positive value (+) when the output signals of the first low pass filter is zero-crossed and an average value of the output signals of the first low pass filter is a negative value (−).

The carrier recovery apparatus may further includes: an accumulator for accumulating output signals of the sign extractor and outputting a sign determination level control signal to the sign extractor in order to select one of sign determination levels at the sign extractor.

In further another aspect of the present invention, a broadcasting receiver includes: an analog processing unit for turning a predetermined channel frequency in a received sky wave signal, eliminating a radio frequency component generated during turning and adjacent channel interference, and outputting an analog passband signal; an A/D converter for converting the analog passband signal to a digital passband signal; a carrier recovery of claims 1 or 6; and an A/V signal processing unit for eliminating the adjacent channel interference additionally inserted to the output signal of the carrier recovery by a transmission channel, correcting errors, recovering a video and audio signal from the corrected signal, and outputting the recovered video and audio signal.

The carrier recovery unit recovers a target baseband signal from the passband signal by using a digital frequency phase loop lock (DFPLL).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
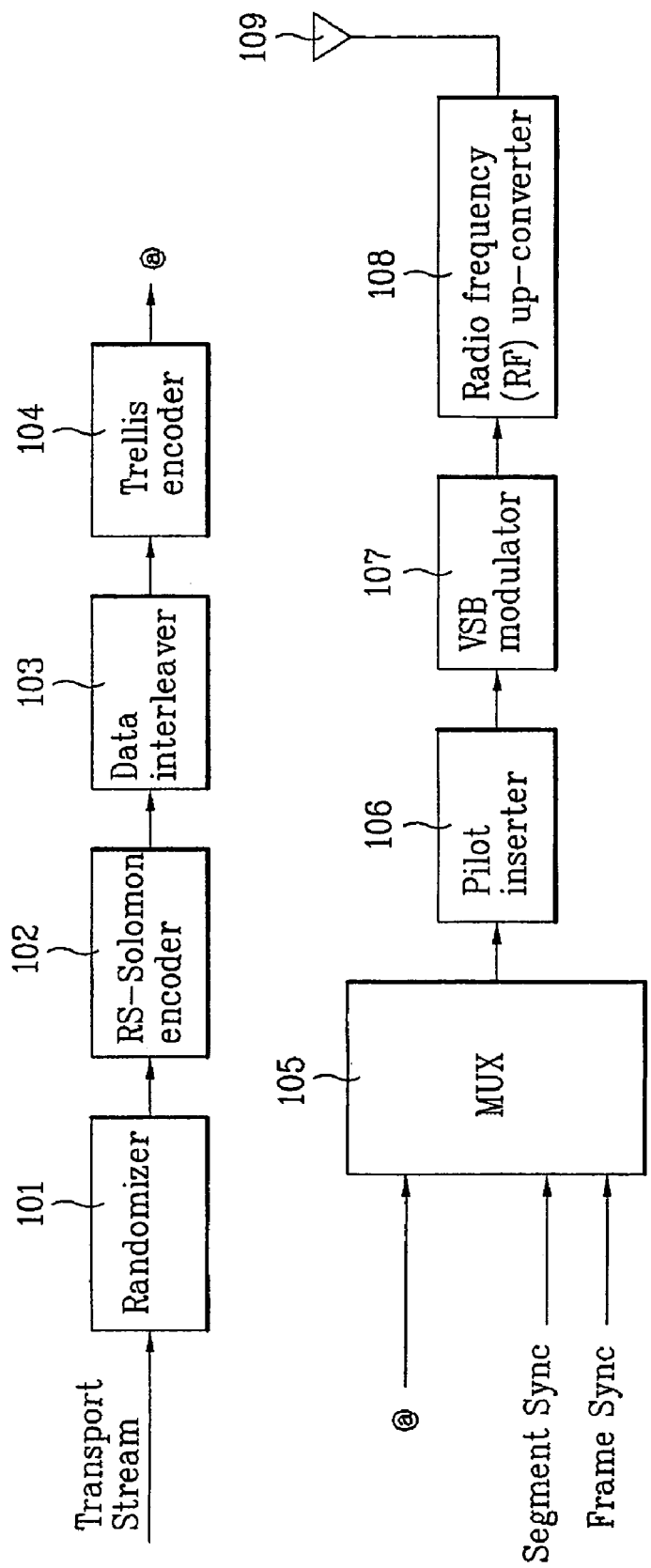
FIG. 1 is a block diagram illustrating a transmitter using a vestigial sideband modulation (VSB) adopted in an advanced television systems committee (ATSC)
Figure 2:
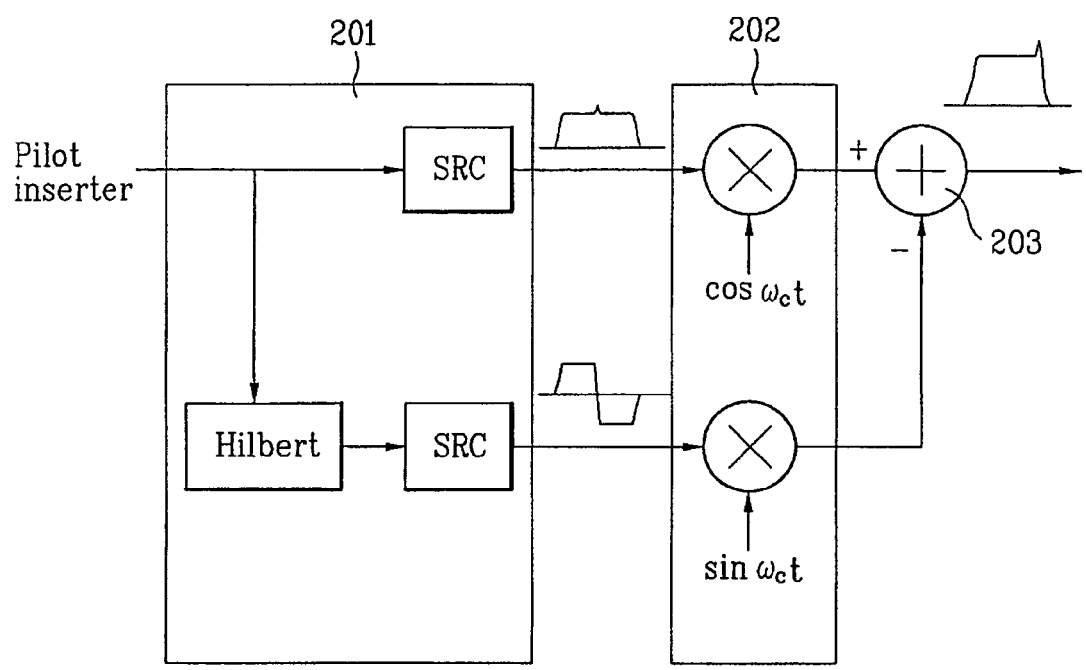
FIG. 2 is a detailed diagram showing the VSB modulator 107 in FIG. 1.
Figure 3:
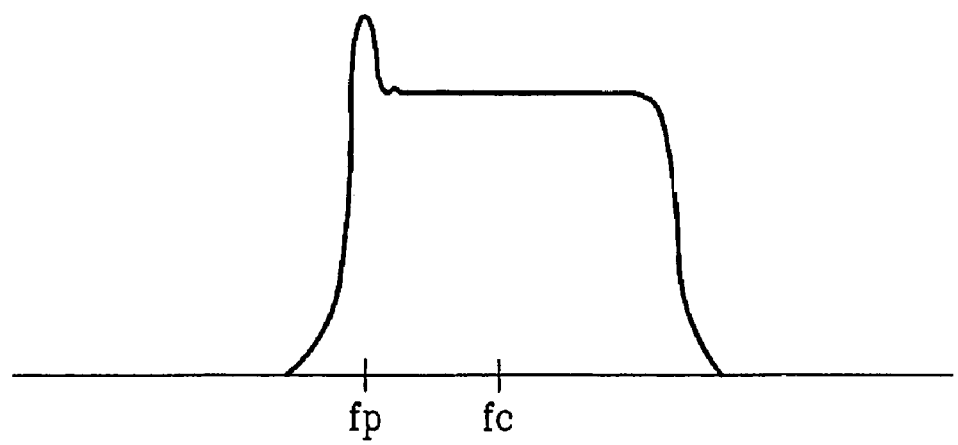
FIG. 3 is a graph showing a frequency characteristic of sky wave signal defined by a digital television (DTV) standard in America and Korea.
Figure 4:
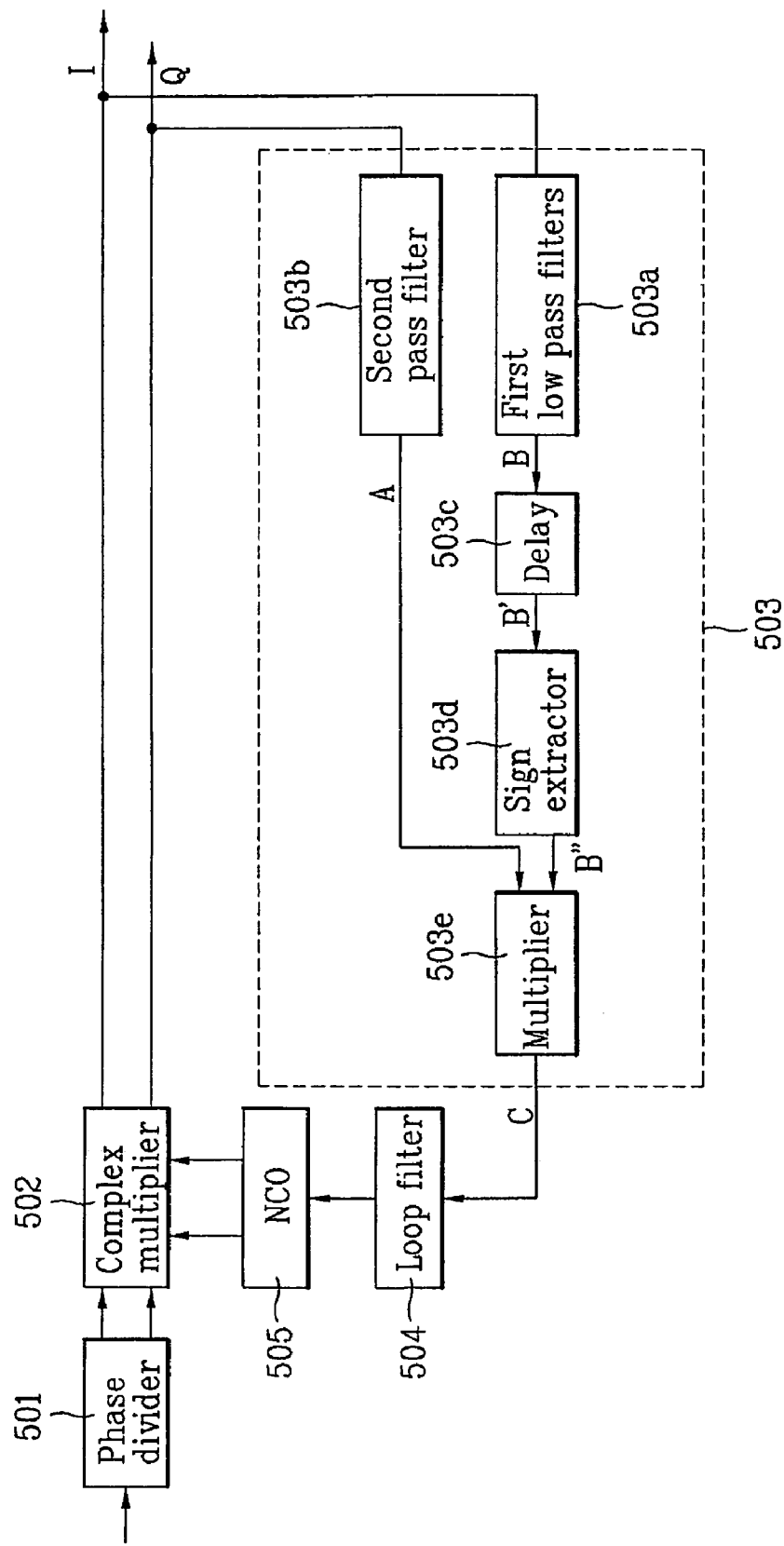
FIG. 4 is a block diagram illustrating a carrier recovery apparatus based on DFPLL in accordance with the related art.
Figure 5A:
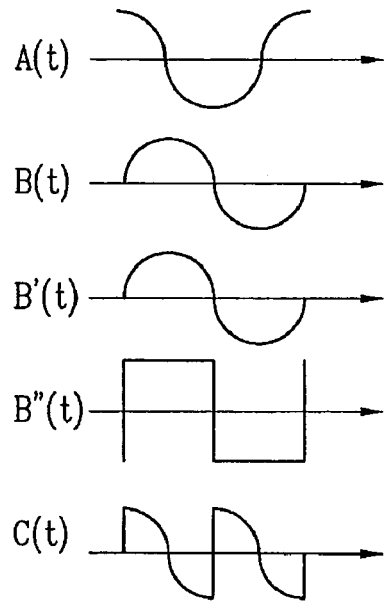
FIGS. 5a to 5c are graphs showing wave forms for explaining principle of FLL operation in a carrier recovery unit in accordance with the related art.
Figure 5B:
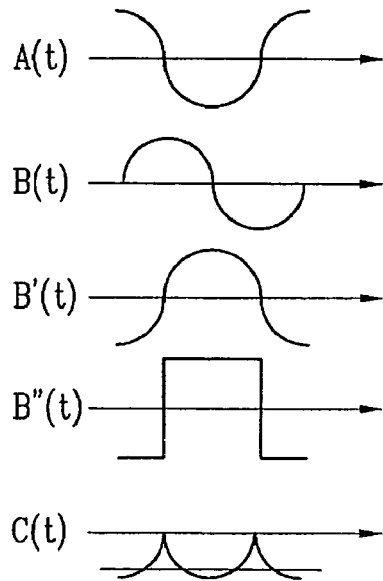
Figure 5C:
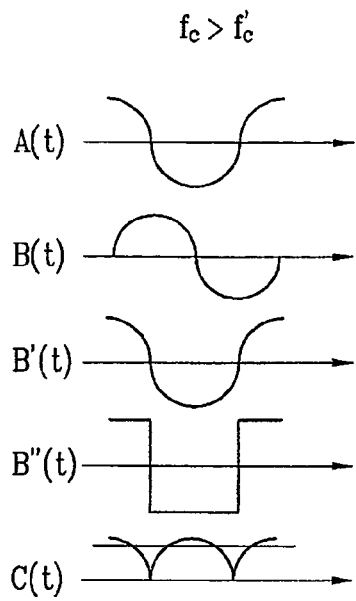
Figure 6:
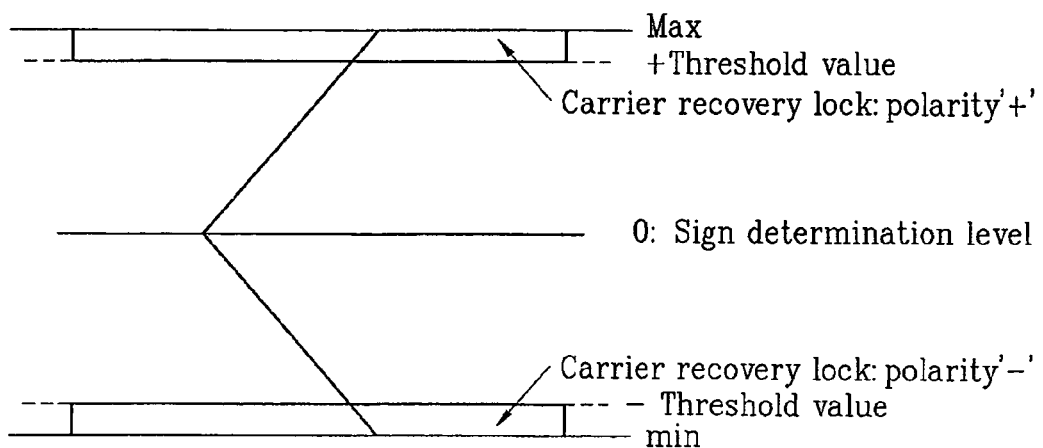
FIG. 6 is a view for explaining a method for locking frequency in a carrier recover unit in accordance with the related art.
Figure 7A:
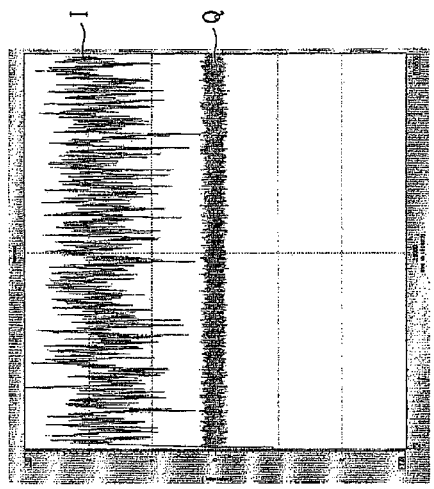
FIGS. 7a and 7b are graphs showing waveforms of I and Q signals outputted from the first and the second low pass filters at a channel having no ghost in accordance with the related art.
Figure 7B:
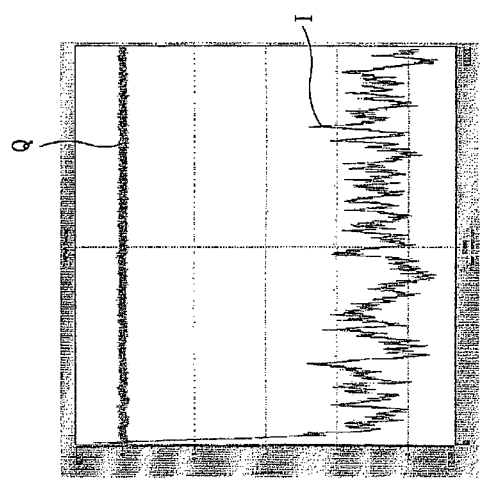
Figure 8A:
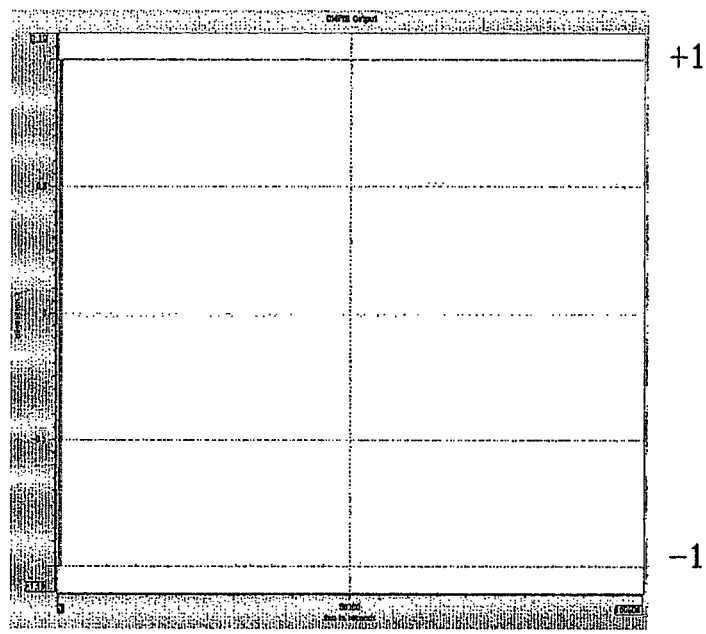
FIGS. 8a and 8b are graphs showing waveforms of output signal from the signal extractor at a channel having no ghost in accordance with the related art.
Figure 8B:
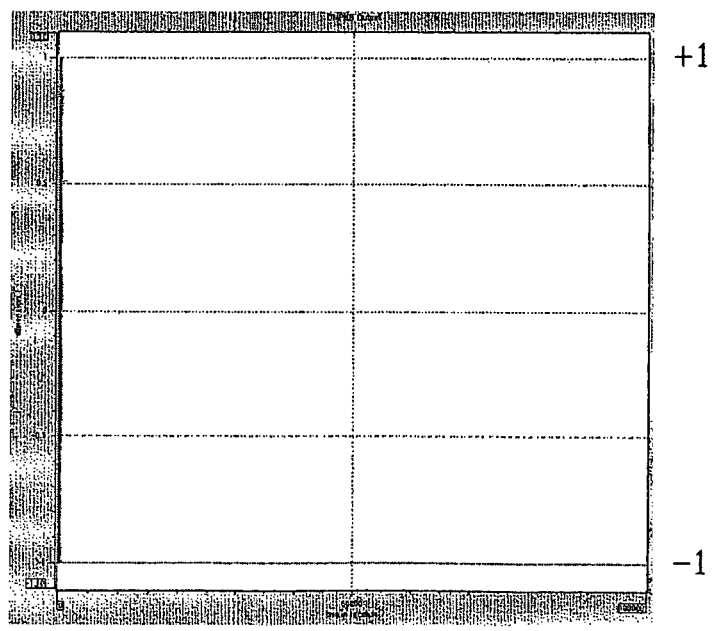
Figure 9A:
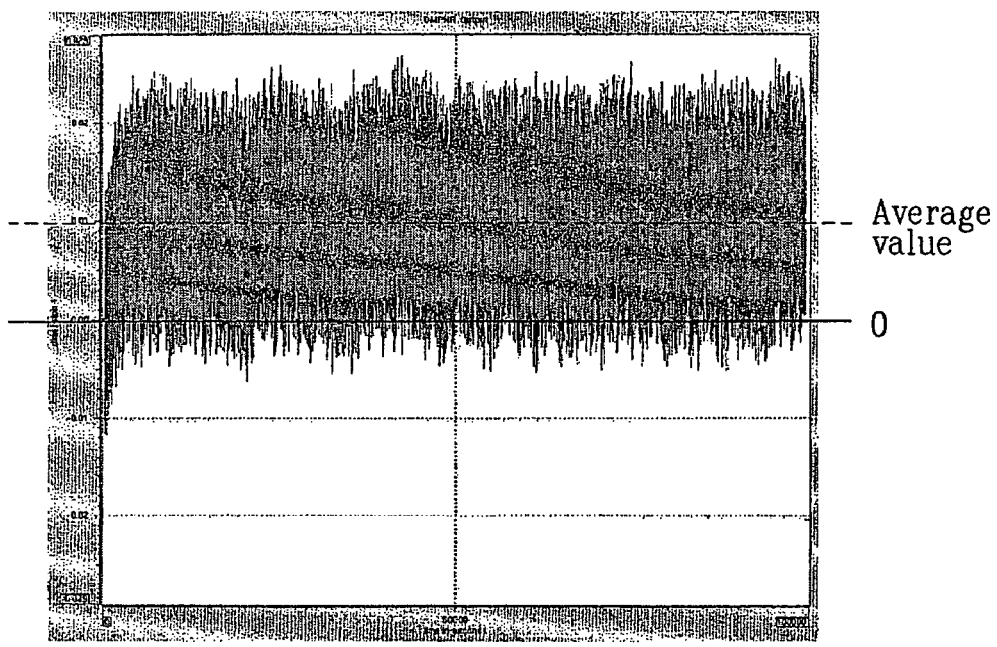
FIGS. 9a and 9b are graphs showing waveforms of output signal from the first low pass filter in accordance with the related art.
Figure 9B:
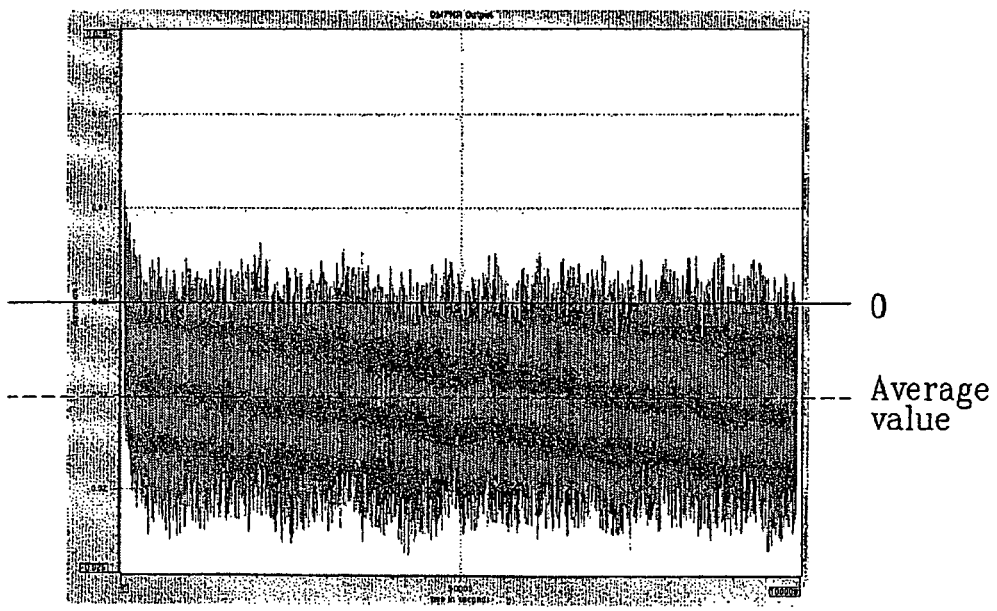
Figure 9C:
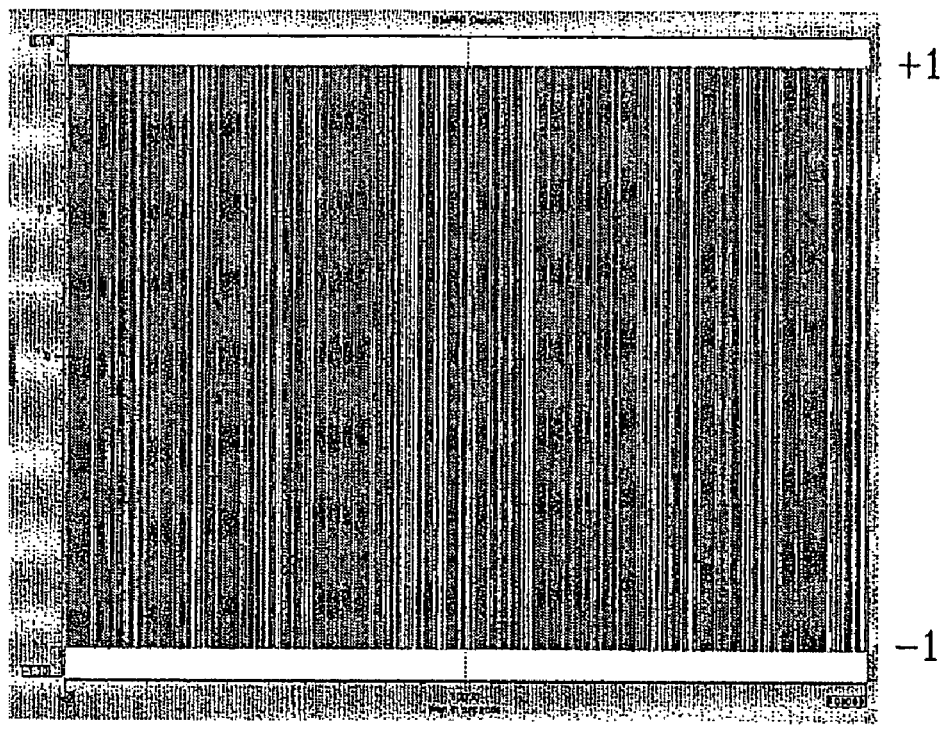
FIG. 9c is a graph showing a waveform of output signal of the sign extractor at a channel having no ghost in accordance with the related art.
Figure 10:
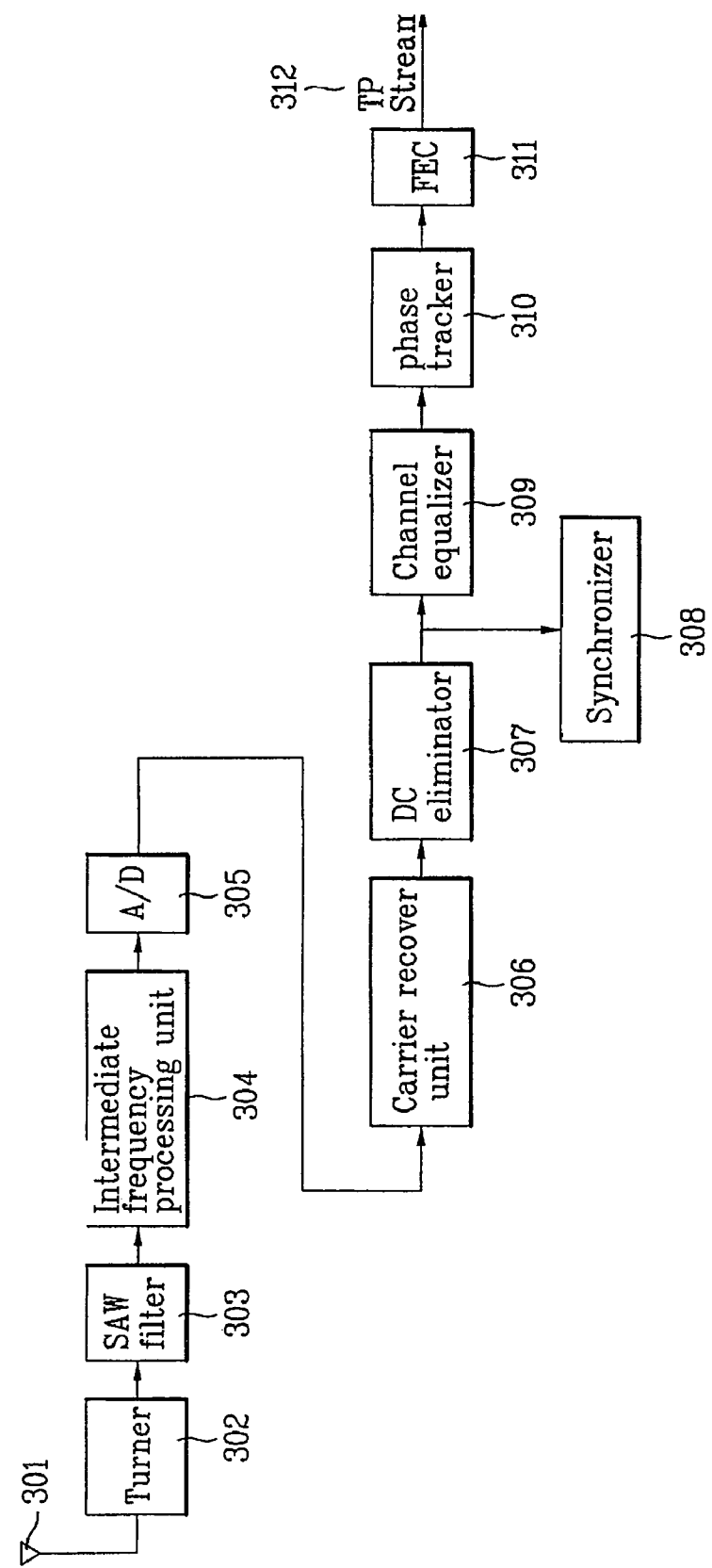
FIG. 10 is a block diagram illustrating a broadcasting receiver for a digital television (DTV) in accordance with a preferred embodiment of the present invention.

FIG. 10 is a block diagram illustrating a broadcasting receiver for a digital television (DTV) in accordance with a preferred embodiment of the present invention.

As shown in FIG. 10, the broadcasting receiver includes an antenna 301, a turner 302, a surface acoustic wave (SAW) filter 303, an intermediate frequency processing unit 304, an A/D converter 305, a carrier recovery unit 306, a DC eliminator 307, a synchronizer 308, a channel equalizer 309, a phase tracker 310 and a FEC 311.

The broadcasting receiver for DTV receives a radio frequency (RF) signal including a pilot signal transmitted from a transmitter. That is, the transmitter modulates a signal according to a vestigial sideband modulation (VSB), inserts the pilot signal into the modulated signal and transmits the RF signal which is modulated according to VSB and includes the pilot signal to the broadcasting receiver.

When the broadcasting receiver receives the RF signal through an antenna 301, the tuner 302 selects a frequency of a target channel, converts a RF band of VSB signal included in the selected frequency channel to an intermediate band, and filters signals of unselected channels.

The output signal of the tuner 302 is outputted to the SAW filter 303 for eliminating adjacent channel signal and a noise. In a digital broadcasting signal, all information is existed in 6 MHz bandwidth from a center frequency in 44 MHz intermediate frequency of the digital broadcasting signal. Therefore, the SAW filter 303 filters the output signal of the turner 302 for obtaining 6 MHz band including information from the output signal of the turner 302 and eliminating remained bands of the output signal of the turner 302. After eliminating the remained bands, the SAW filter 303 outputs the filtered signal to the intermediate frequency processing unit 304.

The intermediate frequency processor 304 multiplies a predetermined gain to the filtered signal from the SAW filter 303 for stabilizing an intensity of a signal outputted to the A/D converter. Accordingly, the A/D converter 305 receives the stabilized signal having constant intensity from the intermediate frequency processing unit 304 and converts the stabilized signal to a digital passband signal.

The digital passband signal outputted from the A/D is inputted to the carrier recovery unit 306. The carrier recovery unit 306 converts the digital passband signal to the baseband signal. During converting the digital passband signal to the baseband signal, a frequency of the pilot signal inserted in the RF signal for demodulating carrier is converted to have 0 Hz of DC component.

Figure 11:
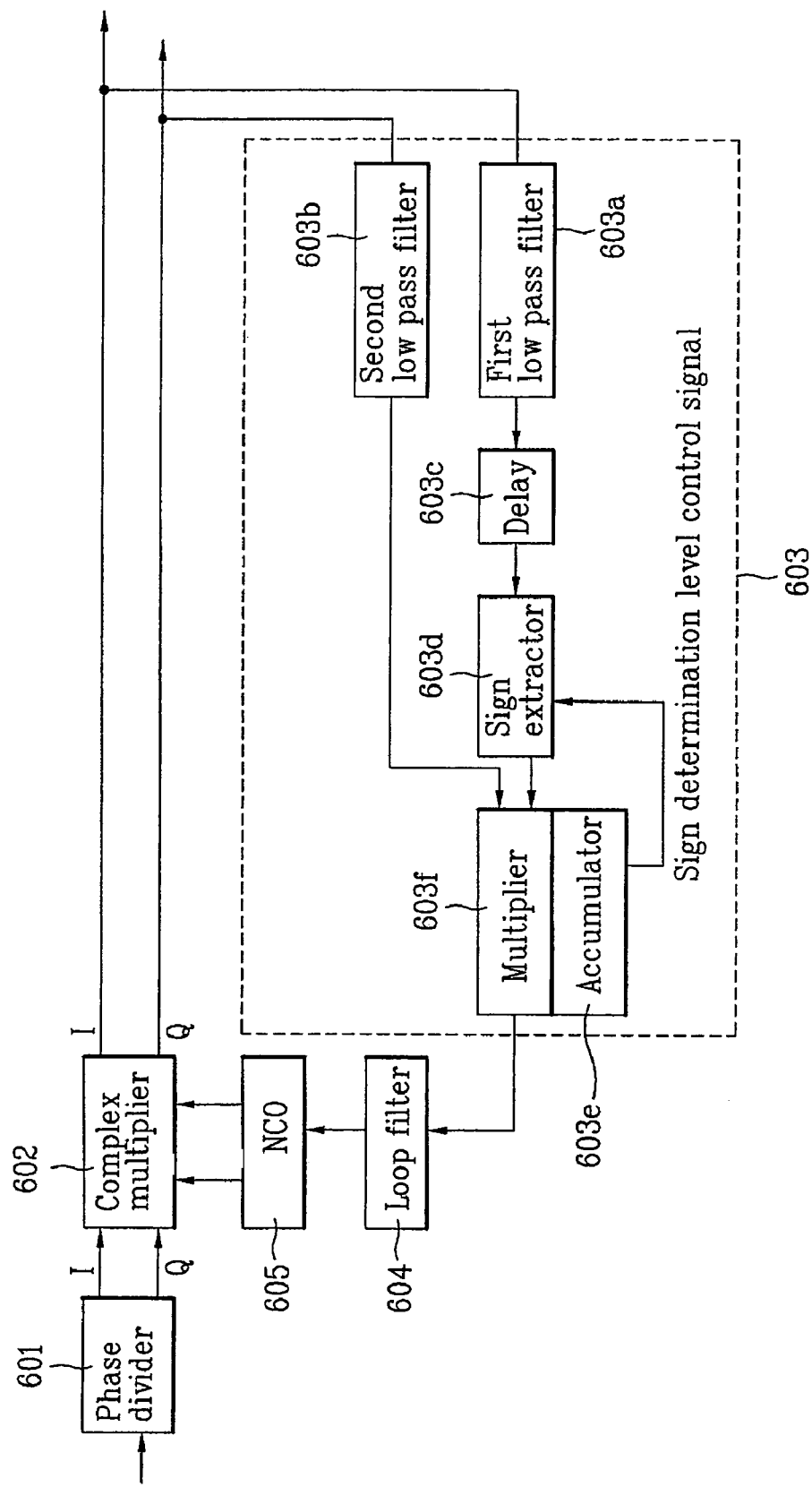
FIG. 11 is a detailed block diagram illustrating a carrier recovery apparatus in a DTV receiver in accordance with a preferred embodiment of the present invention.

FIG. 11 is a detailed block diagram illustrating a carrier recovery apparatus in a DTV receiver in accordance with a preferred embodiment of the present invention.

As shown in FIG. 11, the carrier recovery apparatus includes: a phase divider 601 for dividing the digital passband signal outputted from a A/D converter of a VSB demodulator to a I passband signal and a Q passband signal; a complex multiplier 602 for shifting the I passband signal and the Q passband signal to an I baseband signal and a Q baseband signal by multiplying complex carrier wave (COS, SIN) to the I passband signal and the Q passband signal, respectively; a frequency phase error detector (FPED) 603 for passing frequency components having a pilot component in the I and the Q baseband signals, eliminating remained frequency components having the data components, and detecting a frequency phase error by controlling a sign determination level based on an average value of the remain frequency eliminated signals; a loop filter 604 for filtering the detected phase error from the FPED 603 and integrating the filtered phase errors; and a numerically controlled oscillator (NCO) 605 for outputting a complex carrier (COS, SIN) corresponding to the output signal of the loop filter 604 to the complex multiplier 602.

The FPED 603 includes: a first low pass filter 603a for passing a pilot component of I signal included in the I baseband signal from the complex multiplier 602; a second low pass filter 603b for eliminating a data component in the Q baseband signal from the complex multiplier 602; a delay 603c for delaying the pilot component of I signal as long as a predetermined time; a sign extractor 603d for having sign determination levels having a 0 value, a + value and a − value, selecting one of the sign determination levels, and determining a sign of the delayed I signal from the delay 603c by using the selected sign determination level as a reference; an accumulator 603e for accumulating output signals of the sign extractor 603d, generating and outputting a sign determination level control signal based on the accumulated value in order to select one of the sign determination levels at the sign extractor 603d; and a multiplier 603f for multiplying a sign of the I signal outputted from the sign extractor 603d and the data component eliminated Q signal from the second low pass filter 603b and outputting the multiplying result as a phase error.

The phase divider 601 receives the digital signal from the A/D converter 305 to the I passband signal and the Q passband signal. And, the complex multiplier 602 receives the complex carrier of a sine wave form (SIN) and the complex carrier of a cosine wave forms (COS) from the NCO 605. Also, the complex multiplier 602 receive the I passband signal and the Q passband signal from the phase divider 601. And, the complex multiplier 602 shift the received I passband signal and the received Q passband signal to an I baseband signal and a Q baseband signal by multiplying the I and the Q passband signal to the received complex carriers from the NCO 605.

The I baseband signal and the Q baseband signal are outputted to the DC eliminator 307 located in back of the carrier recovery unit 306. Simultaneously, the I baseband signal is outputted to the first low pass filter 603a in the FPED 603 and the Q baseband signal is outputted to the second low pass filter 603b for recovering the carrier.

Since the carrier recovery requires only a signal adjacent to a frequency having a pilot frequency $f_p$ among 6 MHz bandwidth, the first and the second low pass filters 603a, 603b pass a frequency component having the pilot component from the I and the Q baseband signals and eliminate the remaining frequency components having data components. That is, data components are eliminated in the first and the second low pass filters 603a and 603b, wherein the remaining data components in the I and the Q baseband signal is the DC component which is the signals adjacent the pilot component.

The delay 603c receives the data component eliminated I signal and delay the received I signal as long as a predetermined time for converting a frequency difference to a phase difference. The delayed I signal is outputted to the sign extractor 603d.

The sign extractor 603d determines a sign of the delayed I signal from the delay 603c as a reference of the sign determination level.

If the pilot signal becomes weaken by a ghost existed in a channel, the output signal of the first low pass filter 603a becomes a zero-crossing.

However, an average value of output signals of the first low pas filter 603 is a positive value (+) or a negative value (−) when the pilot signal becomes weaken. From the average value, it can determine whether a frequency of output signal of the NCO 605 is faster or slower than a frequency of the input signal of the carrier recovery unit 306.

Accordingly, the sign determination level is controlled based on the average value of output signals of the first low pass filter 603a. By controlling the signal determination level according to the average value, the output signal of the first low pass filter 603a would not cross the sign determination level and the sign extractor 603 would constantly outputs one of a positive value or a negative value.

That is, if the output signals of the first low pass filter 603a are continuously crossed the sign determination level (zero) and the average value of the output signals is a positive value, the sign determination level is decreased to negative value (−). By decreasing the sign determination level, the zero crossing of the output signals from the first low pass filter can be prevented. Furthermore, if the output signals of the first low pass filter 603a are continuously crossed the sign determination level (zero) and the average value of the output signals is a negative value, the sign determination level is increased to a positive value (+). By increasing the sign determination level, the zero crossing of the output signals from the first low pass filter can be prevented.

The sign determination level is controlled according to a sign determination level control signal outputted from the accumulator 603e.

The output signal of the sign extractor 603d is inputted to the accumulator 603e and the multiplier 603f.

The accumulator 603e accumulates the output signals from the sign extractor 603d.

If the average value of output signals of the first low pass filter 603a is a positive value although the output signals of the sign extractor 603d is zero-crossed, the accumulated value of the accumulator would be a positive value. In contrary, if the average value of output signals of the first low pass filter 603a is a negative value although the output signals of the sign extractor 603d is zero-crossed, the accumulated value of the accumulator would be a negative value.

Accordingly, the accumulator 603e determines the frequency lock when the accumulated value is less than a predetermined threshold value. And, the accumulator 603e generates the sign determination level control signal to increase the sign determination level to a positive value at the sign extractor 603d and outputs the generated sign determination level control signal to the sign extractor 603d.

When the sign determination level control signal is inputted to the sign extractor 603d, the sign extractor 603d increases or decrease the sign determination level according to the received sign determination level control signal and determines the sign of the input signal according to the increased or decreased sign determination level.

The multiplier 603f multiplies the sign of the I signal outputted from the sign extractor 603d and the data component eliminated Q signal outputted from the second low pass filter 603b and outputs the result of the multiplying to the loop filter 604 as a phase error.

The loop filter 604 filters and integrates the inputted phase error and outputs the integrated phase error to the NCO 605. The NCO 605 generates the complex carrier corresponding to the integrated phase error inputted from the loop filter 604 and outputs the generated complex carrier having a form of a cosine wave (COS) or a sine wave (SIN) to the complex multiplier 602.

When the frequency of the pilot of carrier signal component existed in the passband becomes identical to the frequency component of the carrier signal generated by the NCO 605 by the above mentioned procedures, the PLL is completed and the PLL is automatically performed.

In according to the present invention, a polarity of the sign determination level is determined according to the accumulated value at the accumulator 603e and thus the accumulated value represents a state of the frequency lock in the carrier recovery unit.

That is, the accumulator 603e determines a polarity of the sign determination level as a positive when the accumulated value is larger than a positive (+) polarity determination threshold value and outputs the sign determination level control signal to the sign extractor 603d for decreasing the sign determination level to a negative value. In contrary, the accumulator 603e determines a polarity of the sign determination level as a negative when the accumulated value is smaller than a negative (−) polarity determination threshold value and outputs the sign determination level control signal to the sign extractor 603d for increasing the sign determination level to a positive value. Accordingly, the sign extractor 603d constantly outputs a fixed sign value by controlling the sign determination level according to the sign determination level control signal. After then, if the accumulated value is larger than a predetermined threshold value, achievement of the frequency lock can be recognized by the accumulated value.

The DC component generated at the carrier recovery unit 306 is eliminated at the DC eliminator 307 since the DC component is no longer required.

The synchronizer 308 extracts a synchronization signal existed in the transmitting signal from the output signal of the DC eliminator 307, recovers a symbol timing and extracts information in a synchronization signal region. The extracted information is used in the channel equalizer 309, the phase tracker 310 and the FEC 311.

In other words, the channel equalizer 309 receives the DC eliminated signal from the DC eliminator 307 and eliminates a linear noise generated in a transmission channel and analog units in the receiver.

The phase tracker 310 receives the noise eliminated signal from the channel equalizer 309 and eliminates remained phase noise generated at the turner 302. After elimination, the phase tracker 310 outputs the phase noise eliminated signal to the FEC unit 311.

The FEC unit 311 recovers a transmitting symbol from the phase noise eliminated signal and outputs the recovered transmitting symbol as transport stream (TP stream) form.

By generating the TP stream, the role of the receiver in the DTV is completed and the generated TP stream is transferred to the video and audio processing unit.

Figure 12:
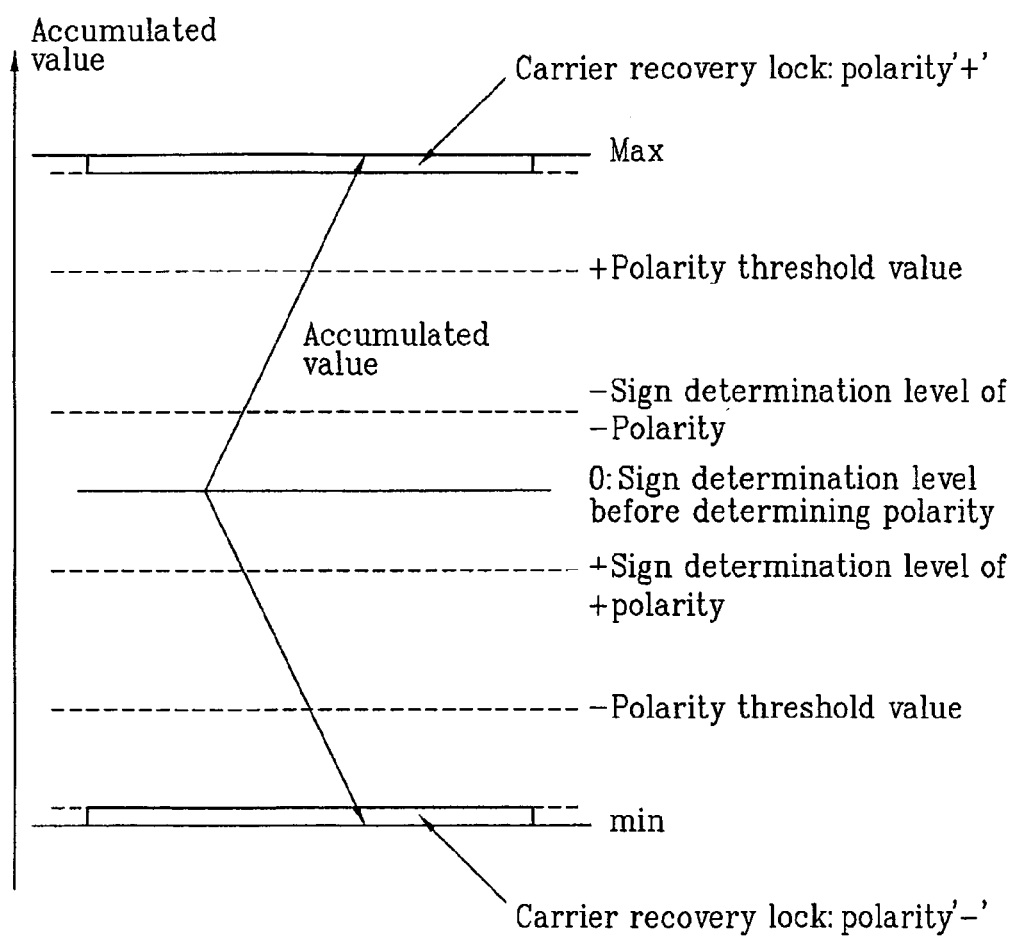
FIG. 12 is a view for explaining a frequency lock in a carrier recovery unit in accordance with a preferred embodiment of the present invention.

FIG. 12 is a view for explaining a frequency lock in a carrier recovery unit in accordance with a preferred embodiment of the present invention.

In FIG. 12, the sign determination level is a reference location for determining a polarity of an input signal of the sign extractor 603d. The sign determination level is 0 before determining the polarity of the input signal. After determining the polarity, if the delay 603e determines the polarity as a positive value (+), the sign determination level is controlled to decrease to a negative value (−) and, in contrary, if the delay 603e determines the polarity as a negative value (−), the sign determination level is controlled to increase to a positive value (+).

Also, in FIG. 12, '+ threshold value' and '− threshold value' are locations for determining a frequency lock in the carrier recovery unit. That is, if an average accumulated value is larger than the controlled sign determination level, it represents that the frequency is locked as the positive polarity (+ polarity), wherein the average accumulated value is a value computed by accumulating the output signal of the sign extractor 603d at the accumulator 603e and averaging the accumulated value.

If the average accumulated value is smaller than the controlled sign determination level, it represents that the frequency is locked as the negative polarity.

Figure 13A:
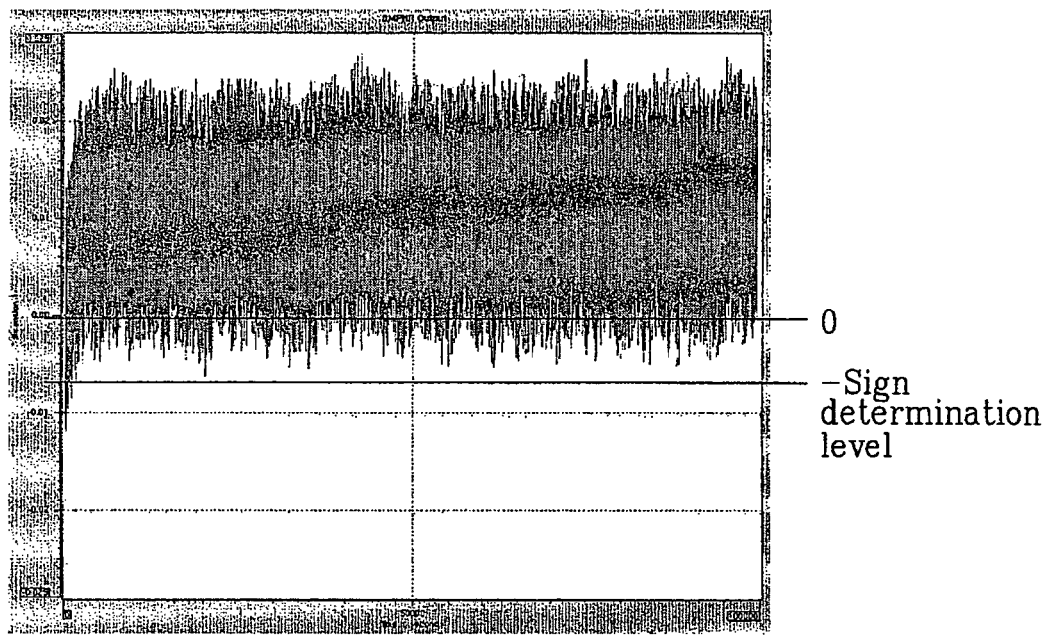
FIGS. 13a and 13b show waveforms of output signals of the first low pass filter in a case of ghost existed in a channel.
Figure 13B:
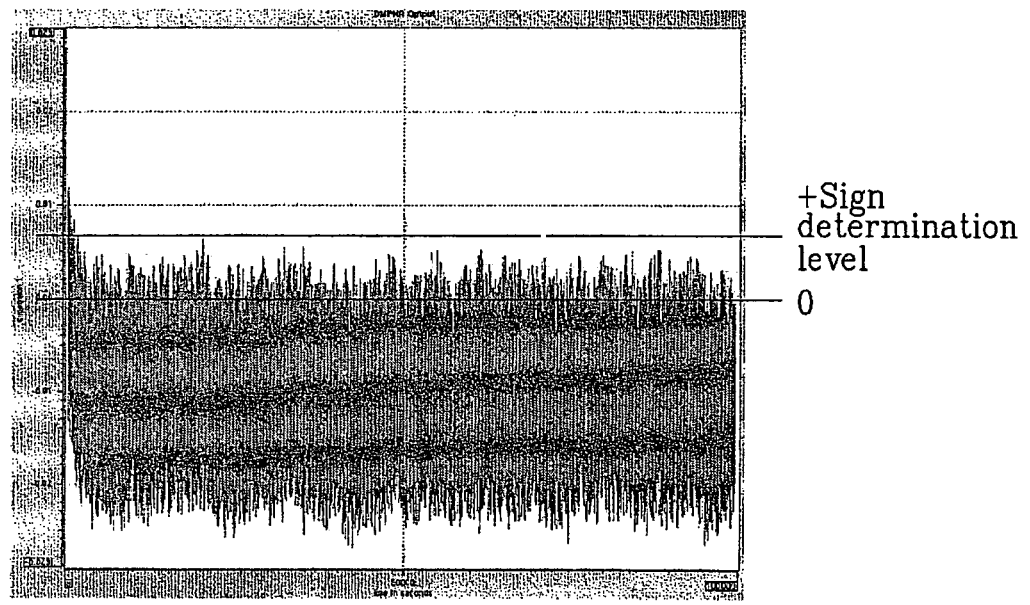

FIGS. 13a and 13b show waveforms of output signals of the first low pass filter in a case of ghost existed in a channel. And, FIGS. 14a and 14b are graphs showing waveforms of output signals of the sign extractor in case of receiving the signals of FIGS. 13a and 13b.

As shown in FIGS. 13a and 13b, the output signal of the first low pass filter 603a is continuously zero-crossed.

In case of FIG. 13a, the sign determination level decreases to a negative value (−) because the average value of the I signal is a positive value (+). Accordingly, the first low pass filter 603a alternatively outputs signals having a positive value (+) or a negative value (−) before the frequency is locked. However, after the frequency is locked, the first low pass filter 603a continuously outputs DC pilot signals having larger value than the sign determination level.

Figure 14A:
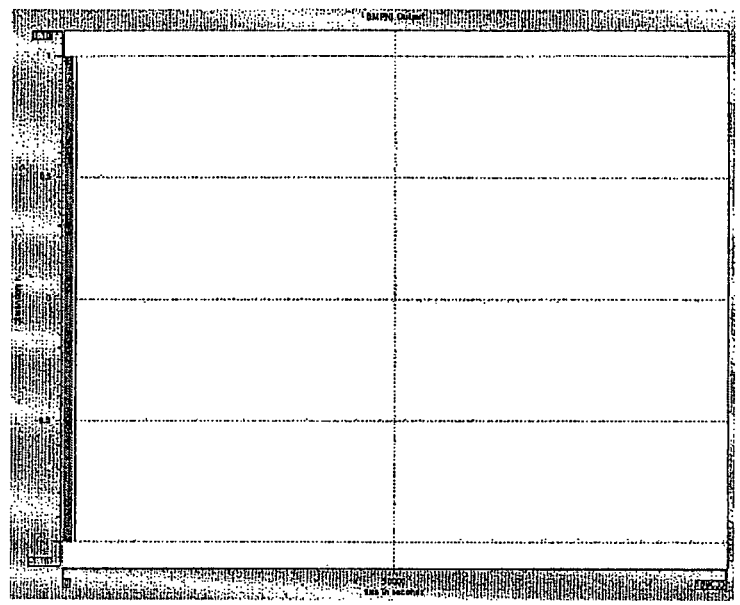
FIGS. 14a and 14b are graphs showing waveforms of output signals of the sign extractor in case of receiving the signals of FIGS. 13a and 13b.
Figure 14B:
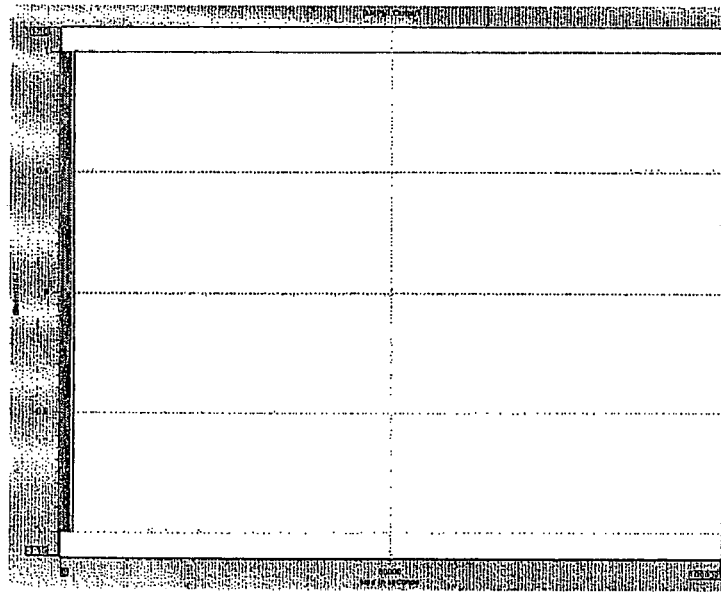

Accordingly, the sign extractor 605 alternatively outputs 1 and −1 at the beginning as shown in FIG. 14a. However, after a certain point, the sign extractor 605 continuously outputs +1 as shown in FIG. 14a.

In contrary, in case of FIG. 13b, the sign determination level increases to a positive value (+) because the average value of the I signal is a negative value (−). Accordingly, the first low pass filter 603a alternatively outputs signals having a positive value (+) or a negative value (−) before the frequency is locked. However, after the frequency is locked, the first low pass filter 603a continuously outputs DC pilot signals (I signal) having smaller value than the sign determination level.

Accordingly, the sign extractor 605 alternatively outputs 1 and −1 at the beginning as shown in FIG. 14a. However, after a certain point, the sign extractor 605 continuously outputs −1 as shown in FIG. 14a.

As mentioned above, the present invention can avoid unnecessary sign extraction caused from the zero-crossing of a signal by dynamically controlling the sign determination level of the sign extractor for improving a frequency locking performance in the carrier recovery apparatus. Specially, the present invention can more effectively increase the frequency locking performing when a large pattern jitter is existed in the passband signal caused from a ghost signal generating comparatively long delay time.

Also, the present invention can stabilize the FLL mode to prevent sudden change from the PLL mode to the FLL mode when the output value of the sign extractor is changed. Accordingly, the tracing performing of the system increases.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A carrier recovery apparatus comprising:
   a first low pass filter for receiving an I baseband signal from a complex multiplier and extracting a pilot component of the I baseband signal by eliminating data components in the I baseband signal, wherein the complex multiplier converts a digital I passband signal and a digital Q passband signal to generate the I baseband signal and a Q baseband signal;
   a second low pass filter for eliminating data components from the Q baseband signal;
   a delay for converting the pilot component of the I baseband signal from the first low pass filter to a DC component;
   a sign extractor for selecting a sign determination level comprising at least one difference value and determining a sign of the I baseband signal output from the delay according to the selected sign determination level;
   an accumulator for accumulating output signals of the sign extractor and outputting a sign determination level control signal to the sign extractor, wherein the sign determination level is determined according to an average value of the output signals compared to a threshold value; and
   a multiplier for generating a phase error by multiplying the sign of the I baseband signal and the eliminated data components from the Q baseband signal.

2. The carrier recovery apparatus of claim 1, wherein the difference values are a zero (0), a positive value (+) and a negative value (−).

3. The carrier recovery apparatus of claim 2, wherein the accumulator generates the sign determination level control signal for selecting the sign determination level having the negative value (−) if the average value is greater than a positive threshold value.

4. The carrier recovery apparatus of claim 2, wherein the accumulator generates the sign determination level control signal for selecting the sign determination level having the positive value (+) if the average value is less than a negative threshold value.

5. The carrier recovery apparatus of claim 1, further comprising:
   a loop filter for generating an integrated signal by filtering and integrating the phase error output from the multiplier; and
   a complex oscillator for generating a complex carrier associated with the integrated signal of the loop filter and outputting the generated complex carrier to the complex multiplier.

6. The carrier recovery apparatus of claim 1, wherein the delay delays the pilot component of the I baseband signal for a predetermined time for converting the pilot component of the I baseband signal to a target DC component.

7. A carrier recovery apparatus comprising:
   a phase divider for dividing a digital passband signal to an I passband signal and a Q passband signal;
   a complex multiplier for shifting the I passband signal and the Q passband signal to an I baseband signal and a Q baseband signal by multiplying the I passband signal and the Q passband signal by a complex carrier of cosine wave (COS) and a complex earner of sine wave (SIN), respectively, wherein the complex carriers are carrier recovered complex carriers;
   a frequency phase error detector (FPED) for passing frequency components comprising a pilot component from the I baseband signal and the Q baseband signal, controlling a sign determination level by using an average value of the I baseband signal and the Q baseband signal where frequencies comprising data components are eliminated, and detecting a frequency phase error,
   wherein the frequency phase error detector comprises an accumulator for accumulating output signals of a sign extractor and outputting a sign determination level control signal to the sign extractor, wherein the sign determination level is determined according to an average value of the output signals compared to a threshold value;
   a loop filter for filtering and integrating the frequency phase error; and
   a numerically controlled oscillator (NCO) unit for generating the complex carriers of the cosine wave (COS) and the sine wave (SIN) associated with the output of the loop filter and outputting the generated complex carriers.

8. The carrier recovery apparatus of claim 7, wherein the frequency phase error detector further comprises:
   a first low pass filter for filtering the pilot component of the I baseband signal output from the complex multiplier;
   a second low pass filter for eliminating data components from the Q baseband signal output from the complex multiplier;
   a delay for delaying the pilot component of the I baseband signal for a predetermined time;
   the sign extractor for selecting the sign determination level comprising at least one difference value and determining a sign of the I baseband signal output from the delay based on the selected sign determination level; and
   a multiplier for generating a phase error by multiplying the sign of the I baseband signal output from the sign extractor and the eliminated data components from the Q baseband signal from the second low pass filter.

9. The carrier recovery apparatus of claim 8, wherein the difference values are a zero (0), a positive value (+) and a negative value (−).

10. The carrier recovery apparatus of claim 9, wherein the sign extractor selects the sign determination level having the negative value (−) when the output signals of the first low pass filter are zero-crossed and the average value is the positive value (+).

11. The carrier recovery apparatus of claim 10, wherein the average value is less than a positive threshold value and larger than 0.

12. The carrier recovery apparatus of claim 9, wherein the sign extractor selects the sign determination level having the positive value (+) when the output signals of the first low pass filter are zero-crossed and the average value is the negative value (−).

13. The carrier recovery apparatus of claim 12, wherein the average value is greater than a negative threshold value and less than 0.

14. A broadcasting receiver comprising:
   an analog processing unit for tuning a predetermined channel frequency in a received sky wave signal, eliminating a radio frequency component generated during tuning an adjacent channel interference, and outputting an analog passband signal;

an A/D converter for converting the analog passband signal to a digital passband signal;

an audio/video (A/V) signal processing unit for eliminating the adjacent channel interference additionally inserted to the output signal of a carrier recovery by a transmission channel, correcting errors, recovering a video and audio signal from a corrected signal, and outputting the recovered video and audio signals; and a carrier recovery apparatus comprising:

a first low pass filter for receiving an I baseband signal from a complex multiplier and extracting a pilot component of the I baseband signal by eliminating data components in the I baseband signal, wherein the complex multiplier converts a digital I passband signal and a digital Q passband signal of the digital passband signal to generate the I baseband signal and a Q baseband signal;

a second low pass filter for eliminating data components from the Q baseband signal;

a delay for converting the pilot component of the I baseband signal from the first low pass filter to a DC component;

a sign extractor for selecting a sign determination level comprising at least one difference value and determining a sign of the I baseband signal output from the delay according to the selected sign determination level;

an accumulator for accumulating output signals of the sign extractor and outputting a sign determination level control signal to the sign extractor, wherein the sign determination level is determined according to an average value of the output signals compared to a threshold value; and a multiplier for generating a phase error by multiplying the sign of the I baseband signal and the data component eliminated Q baseband signal.

15. The broadcasting receiver of claim 14, wherein the carrier recovery apparatus recovers a target baseband signal from the passband signals by using a digital frequency phase locked loop (DFPLL).

16. The broadcasting receiver of claim 14, wherein the carrier recovery apparatus passes frequency components having pilot components and eliminates frequency components having data components.

17. The broadcasting receiver of claim 14, wherein the delay delays the pilot component of the I baseband signal for a predetermined time for converting the pilot component of the I baseband signal to a target DC component.

* * * * *